(12) United States Patent
Kaneda

(10) Patent No.: US 6,246,437 B1
(45) Date of Patent: *Jun. 12, 2001

(54) IMAGE PICKUP DEVICE

(75) Inventor: Kitahiro Kaneda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/871,331

(22) Filed: Jun. 9, 1997

Related U.S. Application Data

(60) Continuation of application No. 08/667,981, filed on Jun. 19, 1996, now abandoned, which is a division of application No. 08/386,118, filed on Feb. 9, 1995, now Pat. No. 5,541,655, which is a continuation of application No. 07/969,996, filed on Nov. 2, 1992, now abandoned.

(30) Foreign Application Priority Data

| Nov. 5, 1991 | (JP) | 3-288874 |
| Dec. 9, 1991 | (JP) | 3-324357 |

(51) Int. Cl.⁷ ................................................ H04N 5/222
(52) U.S. Cl. .................. 348/333.03; 348/345; 348/350
(58) Field of Search ...................... 348/333, 334, 348/350, 208, 345, 333.03, 333.02, 333.01; 396/51

(56) References Cited

U.S. PATENT DOCUMENTS

| 3,909,299 | | 9/1975 | Corrigan . | |
| 4,109,145 | * | 8/1978 | Graf | 250/201 |
| 4,182,795 | | 1/1980 | Baker et al. . | |
| 4,788,110 | | 11/1988 | Bernard . | |
| 4,877,693 | | 10/1989 | Baker . | |
| 5,107,293 | * | 4/1992 | Sekine et al. | 348/208 |
| 5,594,500 | * | 1/1997 | Tanaka et al. | 348/345 |

FOREIGN PATENT DOCUMENTS

| 05130479 | * | 5/1993 | (JP) | H04N/5/232 |

* cited by examiner

Primary Examiner—Wendy R. Garber
Assistant Examiner—Aung S. Moe
(74) Attorney, Agent, or Firm—Robin, Blecker & Daley

(57) ABSTRACT

An image pickup device including a photoelectric conversion device for converting an optical image, obtained from an object through an optical system, into an electrical signal and a monitor for displaying the object image on a monitor image frame based on the electrical signal from the photoelectric conversion device, is provided with a watching point detecting device for detecting the watching point of the operator; a discrimination circuit for discriminating whether the watching point, detected by the watching point detecting device, is positioned inside a predetermined area on the monitor image frame; a detection area setting circuit for setting a detection area, for extracting information for controlling an object of control from an image pickup area, in the image pickup area; and a control circuit for controlling the detection area setting circuit based on the output of the discrimination circuit, in such a manner as to set the detection area at the watching point if the discrimination circuit identifies that the watching point is positioned inside the predetermined area, but to fix the detection area at a predetermined position in the image pickup area if the watching point is identified to be outside the predetermined area.

20 Claims, 13 Drawing Sheets

※ HATCHED PORTION CAN BE USED AS MENU DISPLAY PICTURE BY LINE OF SIGHT SELECTION

※ HATCHED PORTION CAN BE USED AS MENU DISPLAY PICTURE BY LINE OF SIGHT SELECTION $$IPx_\ell = \frac{\sum_{j=1}^{K} iPx_{i-j}}{K}$$

$$IPy_\ell = \frac{\sum_{j=1}^{K} iPy_{i-j}}{K}$$

$IPx_\ell$ AND $IPy_\ell$ ARE MOVING-AVERAGED WATCHING POINT COORDINATES.

$jPx$ AND $jPy$ ARE WATCHING POINT COORDINATES SAMPLED EACH TIME.

IMAGE PICKUP DEVICE

This is a continuation application under 37 CFR 1.62 of prior application Ser. No. 08/667,981 filed on Jun. 19, 1996 (abandoned), which is a divisional of Ser. No. 08/386,118, filed on Feb. 9, 1995 (now U.S. Pat. No. 5,541 655), which is a continuation of Ser. No. 07/969,996, filed on Nov. 2, 1992 (abandoned).

BACKGROUND OF THE INVENTION

1. Field of the Invention

The present invention relates to an image pickup device capable of detecting the watching point of the operator and controlling the image pickup operation utilizing the detected information.

2. Related Background Art

In the field of cameras, there have been significant developments toward automated and diversified functions, and various functions such as automatic focusing and automatic exposure control arts incorporated as standard, thus having resulted in a significant improvement in the operability.

These functions are attained by the information obtained from a detection area selected for example in the image frame. For example, in the automatic focusing, the focus state is detected from high frequency components in the image signal corresponding to the detection area, and the lens can be securely focused to the main object, utilizing thus detected focus state.

More recently, for the purpose of further optimizing the control, there is proposed the use of a sight line detecting device which detects the watching point or the line of sight of the operator in the image frame of the view finder, and sets the detection area, for detecting the information required in the abovementioned various functions, at a point watched by the operator, thereby reflecting the intention of said operator in the setting of the detection area. In this manner it is rendered possible to stably maintain the focused state to a constantly varying object, according to the intention of the operator, without errors such as eventual defocus under certain phototaking conditions or eventual focusing to an article other than the main object.

Such watched point detecting device has been disclosed, for example, in the U.S. Pat. Nos. 4,075,657, 4,109,145 and 4,574,314 and the Japanese Patent Laid-Open Application No. 61-172552.

However the watching point of the operator is not necessarily constant but is anticipated to fluctuate considerably. For this reason, if the defection area is simply set at the detected watching point, the setting position of the detection area becomes inadequate in case the watching point of the operator is displaced from the main object or is outside of the image frame of the view finder, so that the reliability of information obtained from said detection area and the accuracy of control are significantly deteriorated.

Also in case the operator executes an input operation for various functions in the course of a phototaking operation, such operation has to be conducted while the operator looks into the view finder, in order to confirm the switches or the like for such various functions, the operator has to shift his eye from the view finder, and there will result the danger of fluctuation of the image frame or of the main object being lost from the image frame. Such drawback is becoming more serious with the increase in the functions of cameras or camcorders.

As a countermeasure for such drawback, there is conceived a camcorder in which the menu of various functions is displayed on the image frame of the monitoring view finder, then the operator watches a desired function, and a sight line detecting device detects the watching point of the operator whereby a function of which displayed menu is watched by the operator is executed. Such configuration allows the operator to easily effect the input operation for various functions without shifting the eye from the view finder.

Also in the functions assisting the phototaking operation, such as AF, AE, AWB or AS, it is possible to consider that the constantly moving main object is located at the watching position of the operator, to exactly detect said watching position by the sight line detecting device, and to move the detection area, tracking the movement of said watching point, thereby maintaining the moving object constantly in focus. In this manner the various functions can be attained more accurately, without contradicting the intention of the operator.

However, such control system utilizing the sight line detecting device for moving the detection area to the watching point of the operator, though functioning satisfactorily while the operator watches the desired object, will function based on erroneous information resulting from erroneous setting of the detection area if the watched point is positioned outside the image frame of the view finder or is in a position where the detection area cannot be practically set, thus leading to a deteriorated accuracy of control or eventually to an erroneous operation.

SUMMARY OF THE INVENTION

In consideration of the foregoing, a first object of the present invention is to provide an image pickup device, obtaining information for controlling the device by detecting the watching point of the operator in the image frame, capable of constantly stable control without erroneous operations, regardless of the position of said watching point.

A second object of the present invention is to provide an image pickup device, causing the detection area to stably and securely track a moving object and enabling stable taking of a moving image even when the watching point of the operator is positioned outside the image frame or outside the practically controllable area.

The above-mentioned objects can be attained, according to a preferred embodiment of the present invention, by an image pickup device comprising: photoelectric conversion means for converting an optical image, focused on an image pickup face, into an electrical signal, a monitor for displaying the optical image on said image pickup face onto a monitoring image frame, based on the electrical signal released from said photoelectric conversion means; watching point detection means for detecting the watching point of the operator in said monitoring image frame; discrimination means for discriminating whether the watching point, detected by said watching point detection means, is present within a predetermined area on said monitoring image frame; detection area setting means for setting a detection area, for extracting predetermined control information, in said image pickup face; and control means for controlling said detection area setting means, based on the output of said discrimination means, in such a manner as to set said detection area in a position corresponding to the watching point within said image pickup face in case said discrimination means identifies that the watching point is within said predetermined area, or to fix said detection area in a predetermined position within said image pickup face in case the watching point is identified to be outside said predetermined area.

A third object of the present invention is to provide an image pickup device capable of exactly tracking the movement of a main object to be photographed, regardless of the phototaking situation.

A fourth object of the present invention is to provide an image pickup device which judges the watching point of the operator in the image frame as the position of the main object and varying the set position of the detection area, for extracting predetermined control information, tracking the movement of said watching point, said device being capable of causing said detection area to constantly track the main object to be photographed, regardless of the position of the watching point of the operator.

A fifth object of the present invention is to provide an image pickup device, comprising: a sight line detecting device for detecting the positional information of the watching point of the operator; first tracking control means for tracking the movement of said watching point; and second tracking control means not utilizing the positional information of said watching point, thereby achieving appropriate functions.

The above-mentioned objects can be attained, according to a preferred embodiment of the present invention, by an image pickup device comprising: photoelectric conversion means for converting an optical image, focused on an image pickup face, into an electrical signal; a monitor for displaying the optical image on said image pickup face onto a monitoring image frame, based on the electrical signal released from said photo-electric conversion means; watching point detection means for detecting the watching point of the operator in said monitoring image frame; first tracking control means for tracking the movement of said watching point based on the positional information of the watching point, detected by said watching point detection means; second tracking control means for tracking the movement of said optical image without utilizing said watching point; discrimination means for identifying whether said watching point is positioned within a predetermined area on the image frame of said monitor; and control means for selectively activating said first tracking control mode or said second tracking control mode.

Still other objects of the present invention and features thereof will become fully apparent from the following description, which is to be taken in conjunction with the attached drawings.

DETAILED DESCRIPTION OF THE PREFERRED EMBODIMENTS

Now the image pickup device of the present invention will be explained in details by preferred embodiments thereof, applied to a camcorder (video cassette recorder), with reference to the attached drawings.

Figure 1:
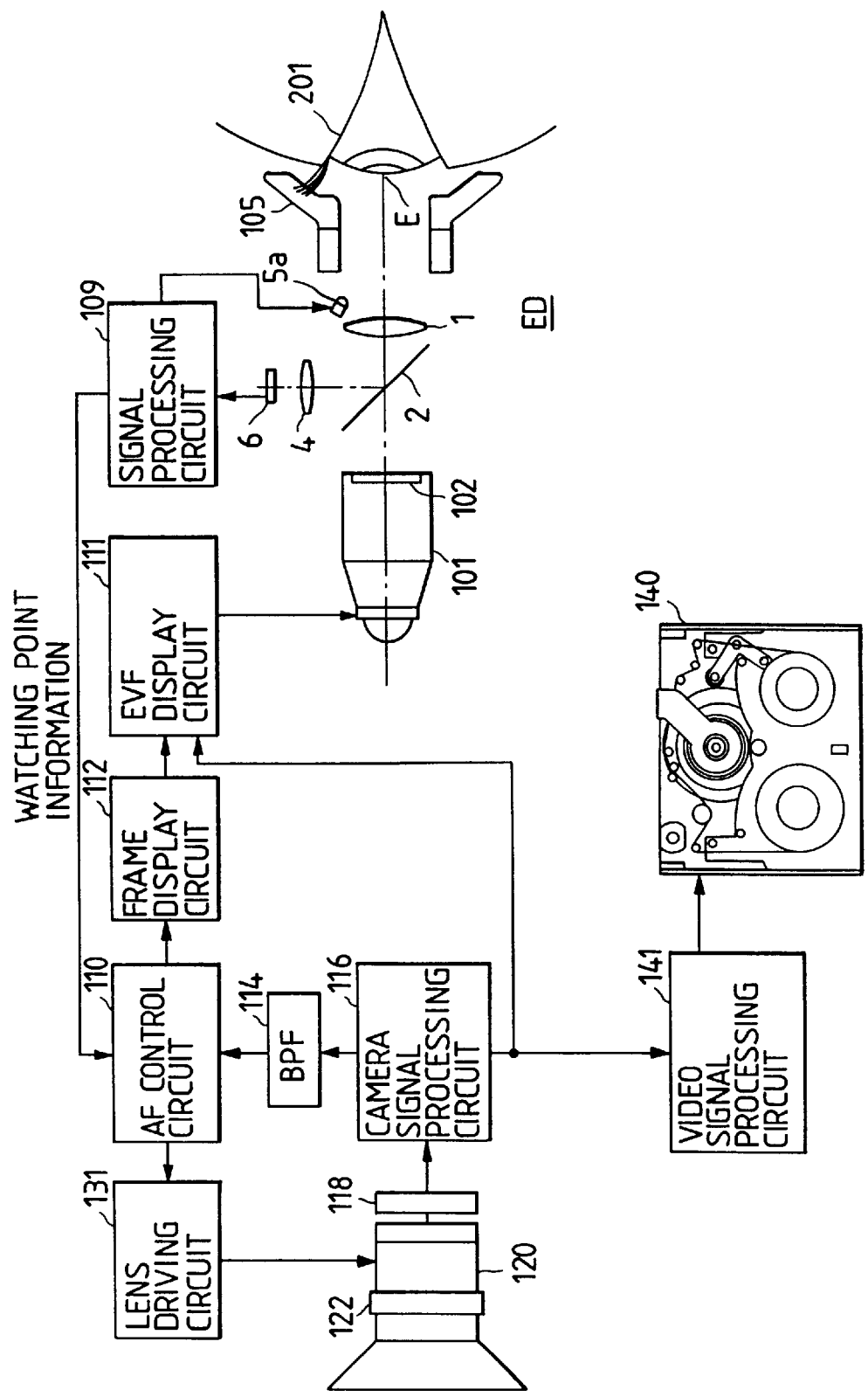
FIG. 1 is a block diagram of a first embodiment of the present invention.

FIG. 1 is a block diagram of a camcorder embodying the present invention.

There are shown an electronic view finder (EVF) 101; a finder image frame 102; a sight line detecting device ED for detecting the line of sight or the watching point of the operator on the image frame of the electronic view finder, composed of an optical system consisting of a photoelectric element array 6, an infrared light-emitting diode 5a (5b FIG. 2), an eyepiece lens 1, a light-receiving lens 4 and a dichroic mirror 2, and of a signal processing circuit 109; and an eyeball 201 of the operator.

Infrared light is emitted by the infrared light-emitting diodes 5a, 5b toward the eyeball of the operator, and the reflected light therefrom is received by the photoelectric element array 6, whereby detected is the watching point of the operator, or the position where the line of sight of the operator falls on the image frame 102 of the electronic view finder 101.

The above-mentioned sight line detecting device ED will be explained further in the following, with reference to FIGS. 2 to 7.

The optical system is composed of the dichroic mirror 2, the eyepiece lens 1 and the light-receiving lens 4. The dichroic mirror 2 transmits the visible light while it reflects the infrared light, thereby transmitting the image on the image frame 102 of the electronic view finder 101 to the eye of the operator while guiding the reflected infrared light from the eyeball to the photoelectric elements 6. The light from the finder image frame 102 reaches the eyeball 201 through the dichroic mirror 6 and the eyepiece lens 1.

Figure 2:
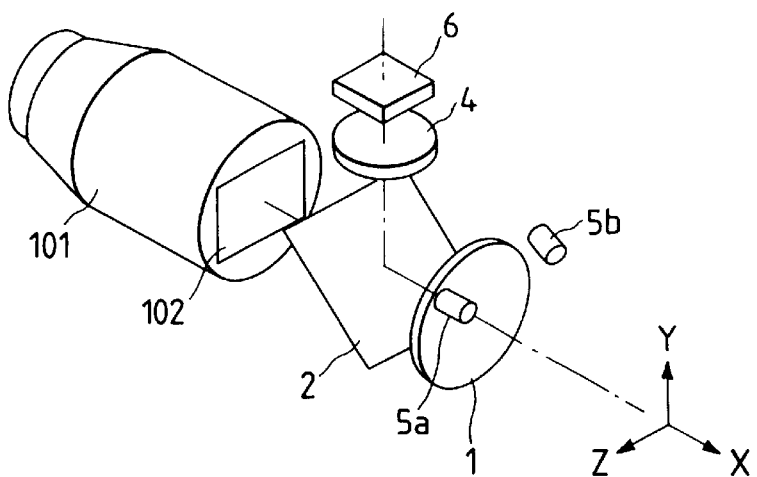
FIG. 2 is a view showing the arrangement of an optical system 100 shown in FIG. 1.

The optical axis of the light entering the eyeball 201 from the image frame 102 is taken as the X-axis (cf. FIG. 2).

Figure 6:
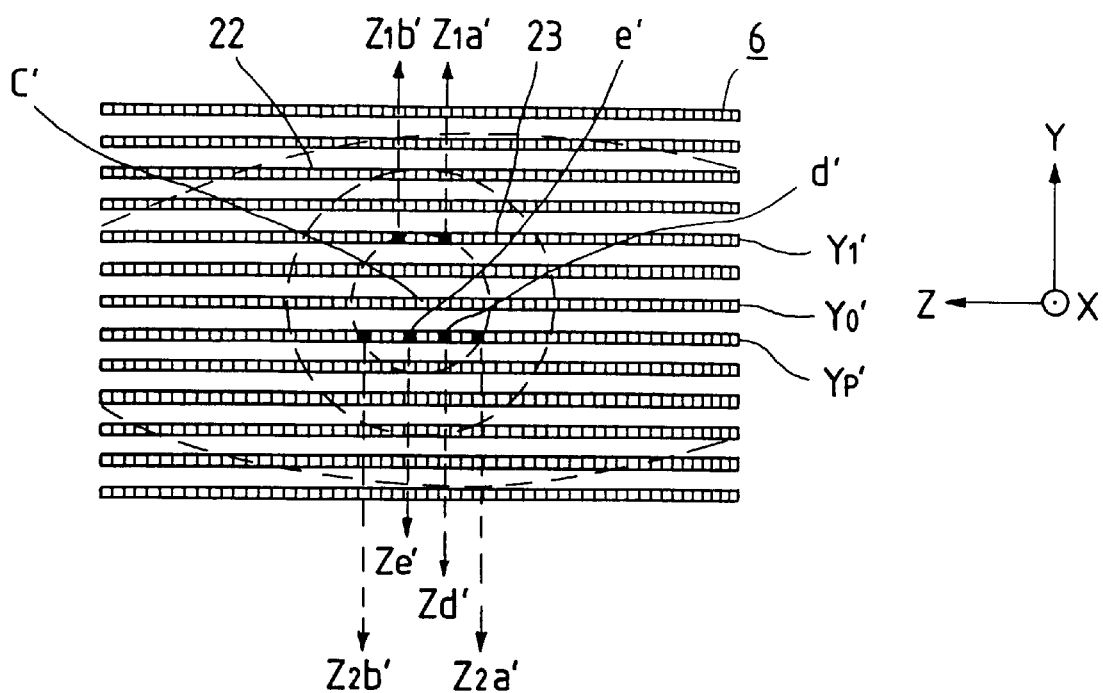
FIG. 6 is a view showing an example of the reflected image from an eyeball 201.

The infrared light-emitting diodes 5a, 5b are positioned symmetrically with respect to the X-axis, in the vicinity of the upper part of the eyepiece lens 1 at the side of the eyeball 201, in such a manner that infrared lights enter the center of the eyeball 201 positioned in the vicinity of an eye point E. The infrared light reflected from the eyeball 201 is transmitted by the eyepiece lens 1, then guided to the light-receiving lens 4 through the dichroic mirror 2 which transmits the visible light but reflects the infrared light, and enters the photoelectric element array 6. FIG. 6 shows an example of the reflected image from the eyeball, formed on the face of the photoelectric element array 6. Now, the Y-axis is defined as parallel to the optical axis of the light guided from the dichroic mirror 2 to the photoelectric element array 6 through the light-receiving lens 4 and perpendicular to the X-axis, and the Z-axis is defined as perpendicular to a plane containing the X- and Y-axes (cf. FIG. 2).

The photoelectric element array 6 contains plural photoelectric elements arranged along lines parallel to the Z-axis.

The signal processing circuit 109 is composed of an eyeball axis detecting circuit for determining the rotational angle of the optical axis of the eyeball; an eyeball judging circuit for determining whether the eyeball watching the finder image frame 102 is the left or right one; a viewing axis correction circuit for correcting the viewing axis, based on the rotational angle of the eyeball optical axis and the information of eyeball judgment; and a watching point detection circuit for calculating the watching point based on optical constants.

In the following there will be explained the configuration of the entire camera.

There are illustrated (FIG. 1) a focusing lens group 120, a zooming lens group 122, an image sensor 118 such as a CCD for converting an optical signal, entered through an optical system including said focusing lens group 120 and zooming lens group 122, into an electrical signal; and a lens drive circuit 131 for driving the focusing lens group 120.

A camera signal processing circuit 116 applies a predetermined signal processing to the image signal from the image sensor 118, thereby generating a standardized image signal. A band pass filter 114 extracts, from the image signal from the signal processing circuit 116, a predetermined high-frequency component which varies according to the focus state and increases as the in-focus state becomes closer.

An AF control circuit 110 extracts a high-frequency component of the image signal obtained through the signal processing circuit 116 and the band pass filter 114, corresponding to a distance measuring frame defined in the image pickup face of the image sensor 118 and drives a lens driving circuit 131 so as to maximize said high-frequency component, thereby controlling the movement of the focusing lens group 120. The AF control circuit 110 also moves the position of said distance measuring frame at the watching point, based on the watching point information detected by the signal processing circuit 109 of the watching point detecting circuit, and discriminates whether the watching point is present in the finder image frame 102, or in a predetermined area therein, and sets the distance measuring frame at the center of the image pickup face in case the watching point is absent in said image frame, or in said predetermined area.

A frame display circuit 112 displays the distance measuring frame in a position around the watching point if it is present within the finder image frame 102, or at the center of said image frame if the watching point is not present therein. An EVF display circuit 111 controls the display on the finder image frame 102, so as to display the image signal from the camera signal processing circuit and to display various control information.

A video signal processing circuit 141 converts the video signal from the camera signal processing circuit 116 into a form suitable for recording on a recording medium such as a magnetic tape. A magnetic recording device (video cassette recorder) 140 records the video signal from the video signal processing circuit 141 on a magnetic tape.

Figure 3:
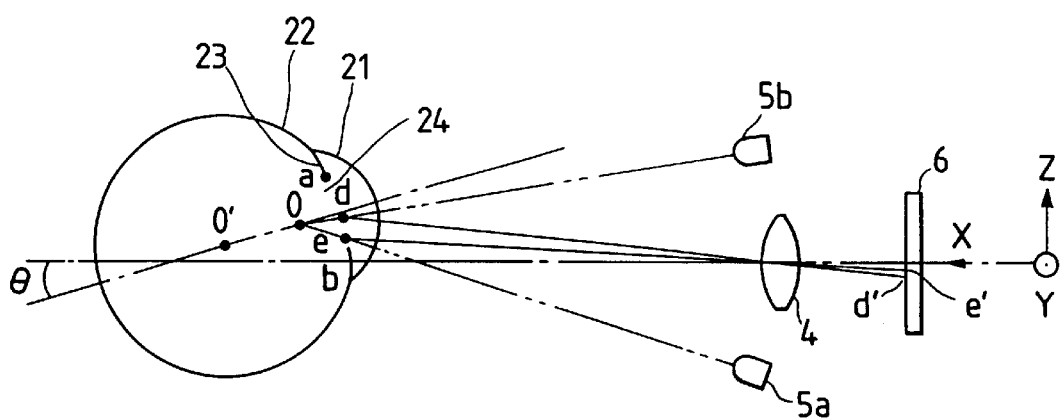
FIG. 3 is a view showing an example of the position of a cornea reflected image in a plane containing X- and Z-axes.
Figure 4:
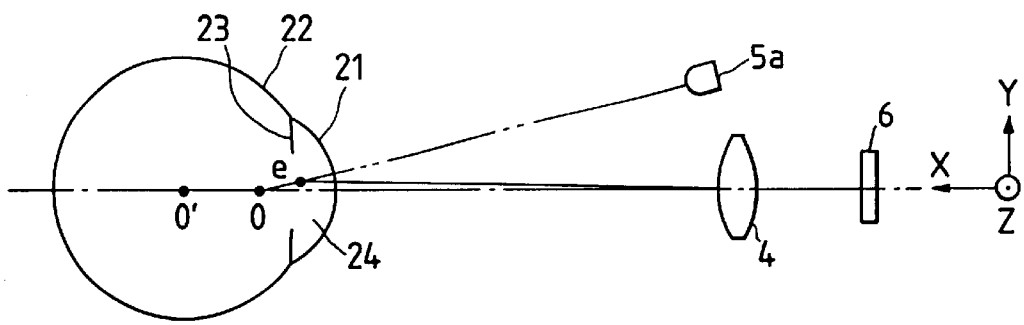
FIG. 4 is a view showing an example of the position of a cornea reflected image in a plane containing X- and Y-axes.

The light beams from the infrared light-emitting diodes 5a, 5b respectively form reflected images e, d on the cornea, in a direction parallel to the Z-axis (cf. FIG. 3). The Z-coordinate of the central point of said reflected images d, e is same as that of the center o of curvature of the cornea 21. When the optical axis of the eyeball is not rotated about the Y-axis, namely when said optical axis coincides with the X-axis (when the center o of curvature of cornea and the center C' of pupil being on the X-axis), the reflected image e is displaced in the +Y direction from the X-axis (cf. FIG. 4).

Figure 5:
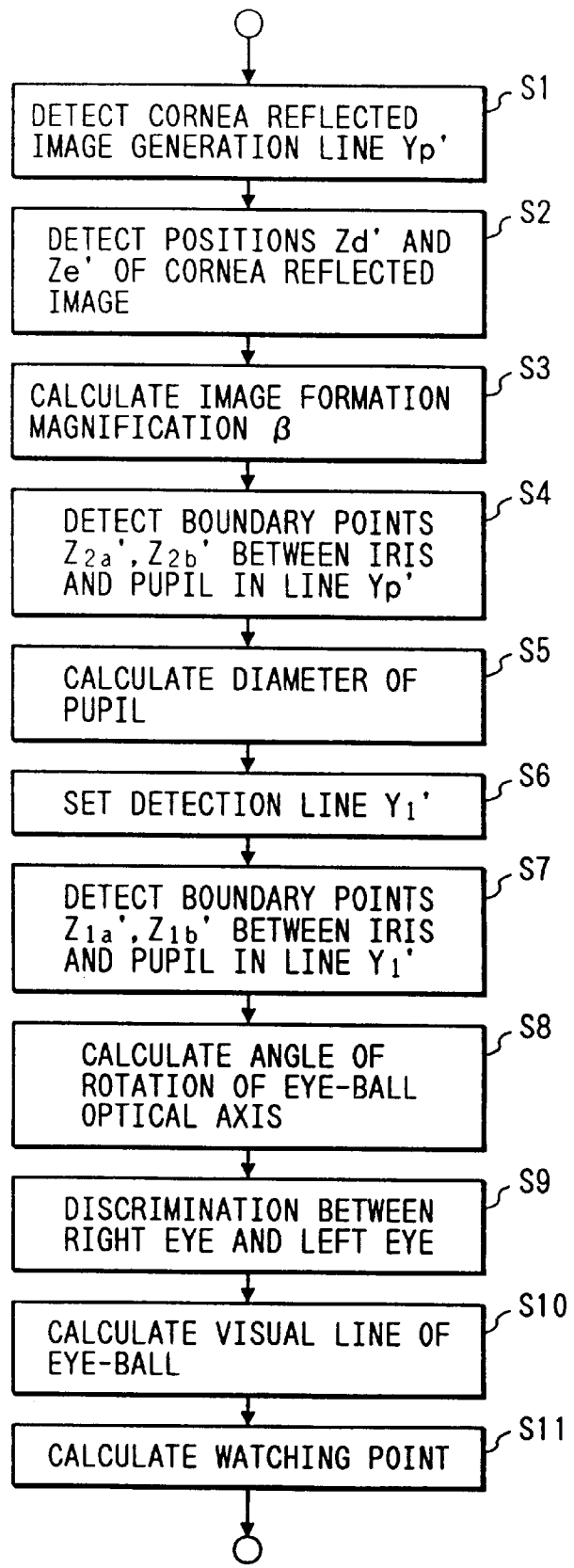
FIG. 5 is a flow chart showing an example of the sight line detecting procedure executed by a signal processing circuit 109.

FIG. 5 is a flow chart showing the sequence of detection of line of sight by the signal processing circuit 109.

Figure 7:
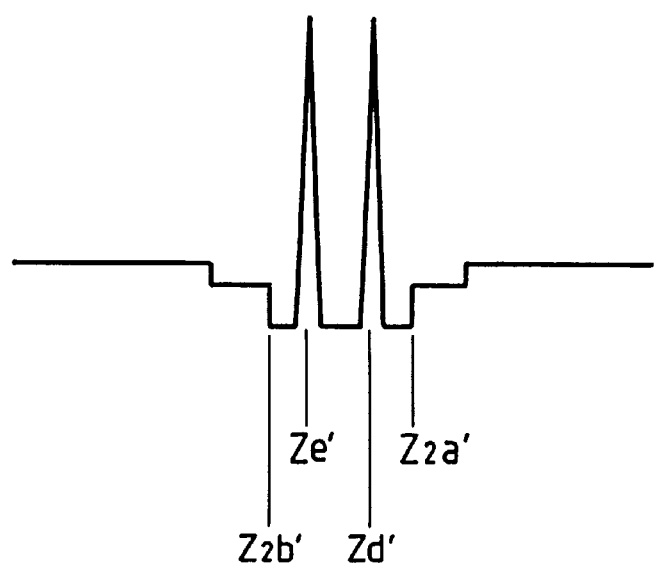
FIG. 7 is a chart showing an example of the output signal obtained from a row $Y_p'$ of photoelectric elements.

The rotational angle of the optical axis of the eyeball is detected by the eyeball optical axis detection circuit, then the image signal is read from the photoelectric element array 6 in succession from −Y direction shown in FIG. 6, and a row Yp' of the photoelectric element array 6, where cornea reflected images e', d' are formed, is detected (step S1). Then positions Zd', Ze' of said reflected images e', d' in the direction of array of the photoelectric element array 6 (step S2). FIG. 7 shows an example of the output signal obtained from the row Yp' of the photoelectric element array 6. Then the imaging magnification β of the optical system is determined from the distance |Zd'—Ze'| of the reflected images (step S3). As the distance of the reflected images e, d is proportional to the distance between the light-emitting diodes 5a, 5b and the eyeball of the operator, the imaging magnification β of reflected images can be determined by the detection of the positions e', d' of refocused images on the photoelectric element array 6. Then, on the row Yp' of the photoelectric element array 6 where the reflected images e, d are refocused, the boundaries Z2b', Z2a' between the iris 23 and the pupil 24 are detected (step S4), and the pupil diameter |Z2b'−Z2a| on said row Yp' is calculated (step S5).

The row Yp' of the array 6 on which the cornea reflected images are formed is normally displaced, as shown in FIG. 6, in the −Y direction from a row Y0' where the center C' of the pupil is present. Then another row Y1' of the photoelectric elements, from which the image signal is to be read, is calculated from the imaging magnification β and the pupil diameter (step S6). Said row Y1' is sufficiently distant from the row Yp'. Subsequently the boundaries Z1b', Z1a' of the iris 23 and the pupil 24 on the row Y1' are detected (step S7), and the center C' (Zc', Yc') of the pupil is determined from at least three of the boundary points (Z1a', Y1'), (Z1b', Y1'), (Z2a', Yp') and (Z2b', Yp').

Then the rotational angles θz, θy of the optical axis of eyeball are determined from the positions (Zd', Yp'), (Ze', Yp') of the cornea reflected images, based on the following equations (step S8):

$$\beta \cdot \overline{OC} \cdot \sin\theta z \approx Zc' - (Zd' + Ze')/2 \tag{1}$$

$$\beta \cdot \overline{OC} \cdot \sin\theta y \approx Yc' - Yp' + \delta Y' \tag{2}$$

wherein δY' is a correction value for correcting the refocused positions e', d' of the reflected images in the Y-direction, with respect to the Y-coordinate of the center of curvature of the cornea 21 on the photoelectric element array 6, based on a fact that the infrared light-emitting diodes 5a, 5b are arranged, with respect to the light-receiving lens 4, in a direction perpendicular to the rows of the photoelectric element array 6.

Subsequently the eyeball judging circuit judges whether the eye, looking into the view finder, is the right or left one of the operator, based for example on the calculated distribution of the rotational angles of the optical axis of the eyeball (step S9), then the viewing axis is corrected by a correction circuit, based on the eyeball judging information and the rotational angles of the optical axis of the eyeball (step S10), and the watching point detection circuit calculates the watching point, based on the optical constants of the optical system 100 (step S11).

Figure 8:
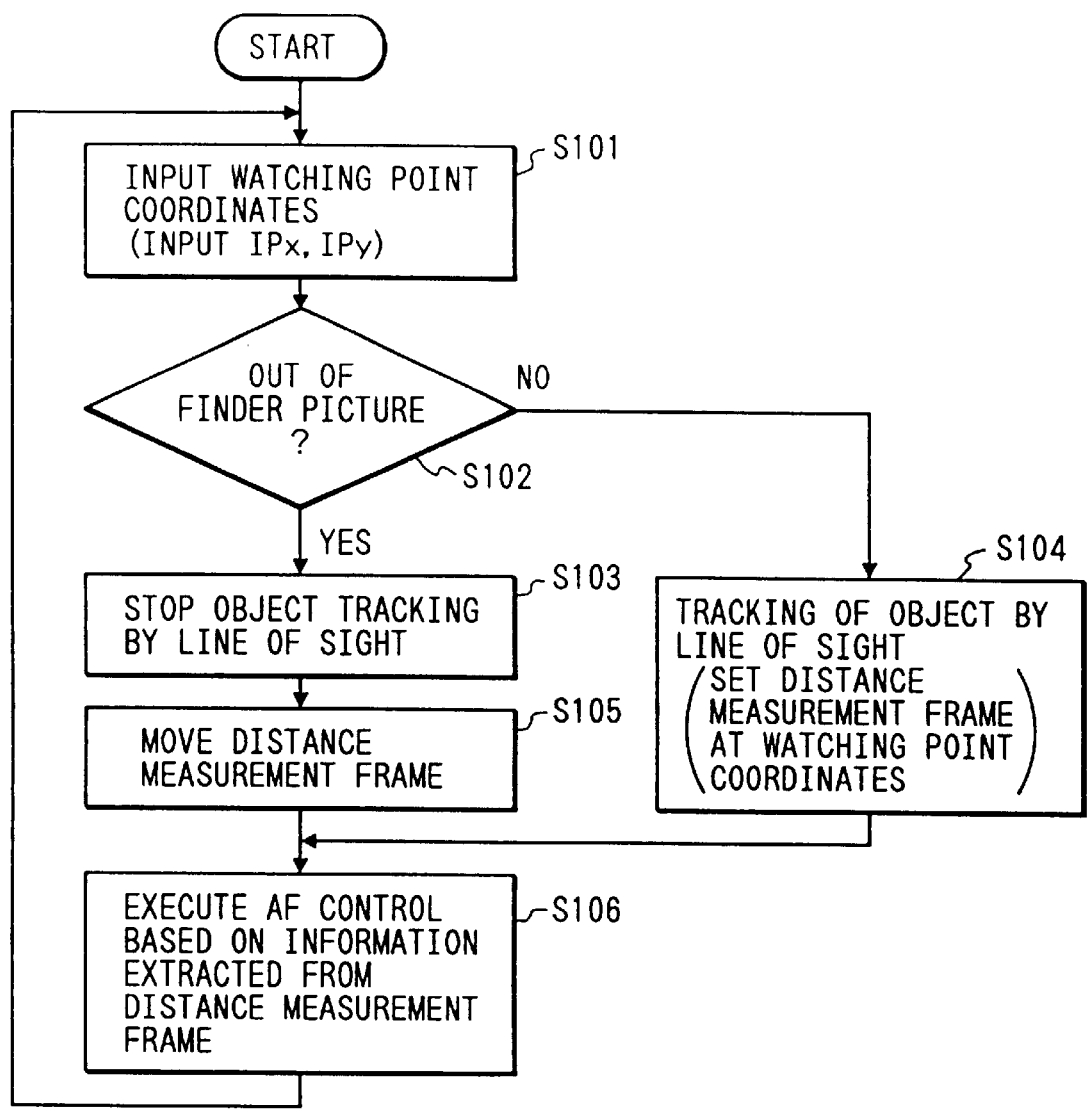
FIG. 8 is a flow chart showing an example of the control sequence to be executed by an AF control circuit 110 shown in FIG. 1.

FIG. 8 is a flow chart showing the control sequence executed by the AF control circuit 110 shown in FIG. 1.

Figure 9:
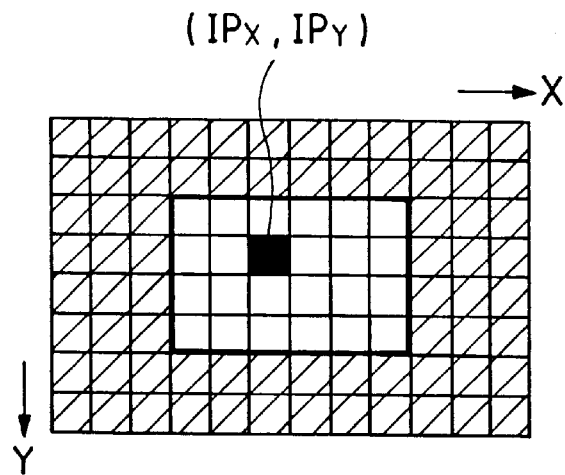
FIG. 9 is a view showing an example of the two-dimensional coordinate plane for the watching point detection.

The detection of the watching point by the watching point detection circuit 109 is conducted, in the present embodiment, in a coordinate plane of the electronic view finder (EVF) shown in FIG. 9, including a predetermined (non-hatched) area of the finder image frame corresponding to the image pickup face and a hatched area outside said predetermined area. Hereinafter the inside and outside of said predetermined area shall be referred to as inside and outside of the finder image frame.

At first a step S101 receives the coordinate values (IPx, IPy) of the watching point of the operator from the watching point processing circuit 109, and a step S102 discriminates whether said coordinates (IPx, IPy) of the watching point are outside the finder image frame. If outside, a step S103 interrupts the object tracking operation for moving the distance measuring frame to the watching point, then a step S105 fixes the distance measuring frame at the center of the finder image frame, and a step S106 effects the AF control, based on the information obtained from thus fixed distance measuring frame. On the other hand, if the step S102 identifies that the coordinates (IPx, IPy) of the watching point are within the finder image frame, then a step S104 executes the object tracking by the line of sight and sets the distance measuring frame with the center at the watching point, and then the step S106 detects the high-frequency component in said frame and effects the AF control operation based on thus detected high frequency component, by driving the focusing lens group so as to maximize said high-frequency component.

In the following there will be explained a second embodiment of the present invention. The foregoing first embodiment is so designed to detect the watching point of the operator in the finder image frame and to set the distance measuring frame at said watching point.

The present second embodiment sets an AS frame for prevention of vibration, at the watching point of the operator.

At first there will be given a brief explanation on the background of the auto stabilizing (AS) system. In industrial and consumer applications, the vibration of camera not only deteriorates the image but also constitutes the cause of various errors in the operation. Particularly the photo-taking operation during walking or on a moving vehicle or in a location involving vibration tends to generate blur in the image, and various vibration compensating methods have been proposed.

For example, an anti-vibration camera disclosed in the Japanese Patent Laid-open Application No. 61-248681 is so designed as to convert the incident image into an electrical signal by an image taking system composed of an optical system and a photoelectric converting device, and to supply an image signal, subjected to a predetermined signal processing, to a monitor unit and to an image vibration detection circuit, which detects the magnitude and direction of the image vibration by calculating the correlation between two images of a predetermined time interval. The optical system is driven in a direction to cancel the image vibration, based on the result of said detection, thereby obtaining a stable image despite of the vibration of the apparatus. The "anti vibration" means the function for compensating the camera vibration.

However, if the amount of vibration is detected from the image in this manner, with a uniform sensitivity over the entire image frame, it is not possible to distinguish the eventual movement or deformation of the object from the inclination or vibration of the camera resulting from the shaking of the hands of the operator, so that there may result an erroneous compensation of vibration, as a result of recognition of an object not intended by the operator.

For avoiding such drawback, there is required a process of recognizing the positions, shapes and movements of the objects and detecting the amount of image vibration within a predetermined area. An image vibration detecting device based on such principle is described in "On Image Vibration Correcting Device" in the Technical Report of Television Society, Vol. 11, No. 3, p. 34–48, PPOE, "87–12 (May, 1987)". In this report, the detection of vibration is achieved by dividing the entire image frame into 140 blocks, arbitrarily turning on and off the detection in each block in manual manner, and determining a movement vector by the representative point matching method on the turned-on blocks only. The area for detecting the image vibration is determined, for example, by a method utilizing the difference in luminance between the background and the object, or a method of detecting the area of movement from the difference in images of a predetermined time interval.

However, in the above-explained AS system, particularly when loaded in a camcorder or the like, it is difficult to securely distinguish the object from the background and to identify an optimum block of the image frame for the detection of vibration, and an unnatural image is often obtained by the vibration compensation in an inadequate detection area.

Consequently the present embodiment, assuming that the watching point of the operator lies on the main object during the phototaking operation, detects the watching point in the image frame by detecting the line of sight of the operator, and effects the detection of vibration, considering a predetermined area around said watching point as the main object and the outside of said predetermined area as the background.

In this manner it is rendered possible to always effect the detection and compensation of vibration with reference to the background, and to prevent erroneous judgment of the movement of object as a vibration of the camera.

Also in the present embodiment, when the watching point of the operator is in an area outside the finder image frame, where the object is absent, namely when the operator is evidently not watching the main object, there is provided a safety measure for fixing the AS area in a predetermined position, for example at a peripheral position not covering the center of the image frame.

Said second embodiment will be explained in the following, with reference to a block diagram shown in FIG. 10.

Figure 10:
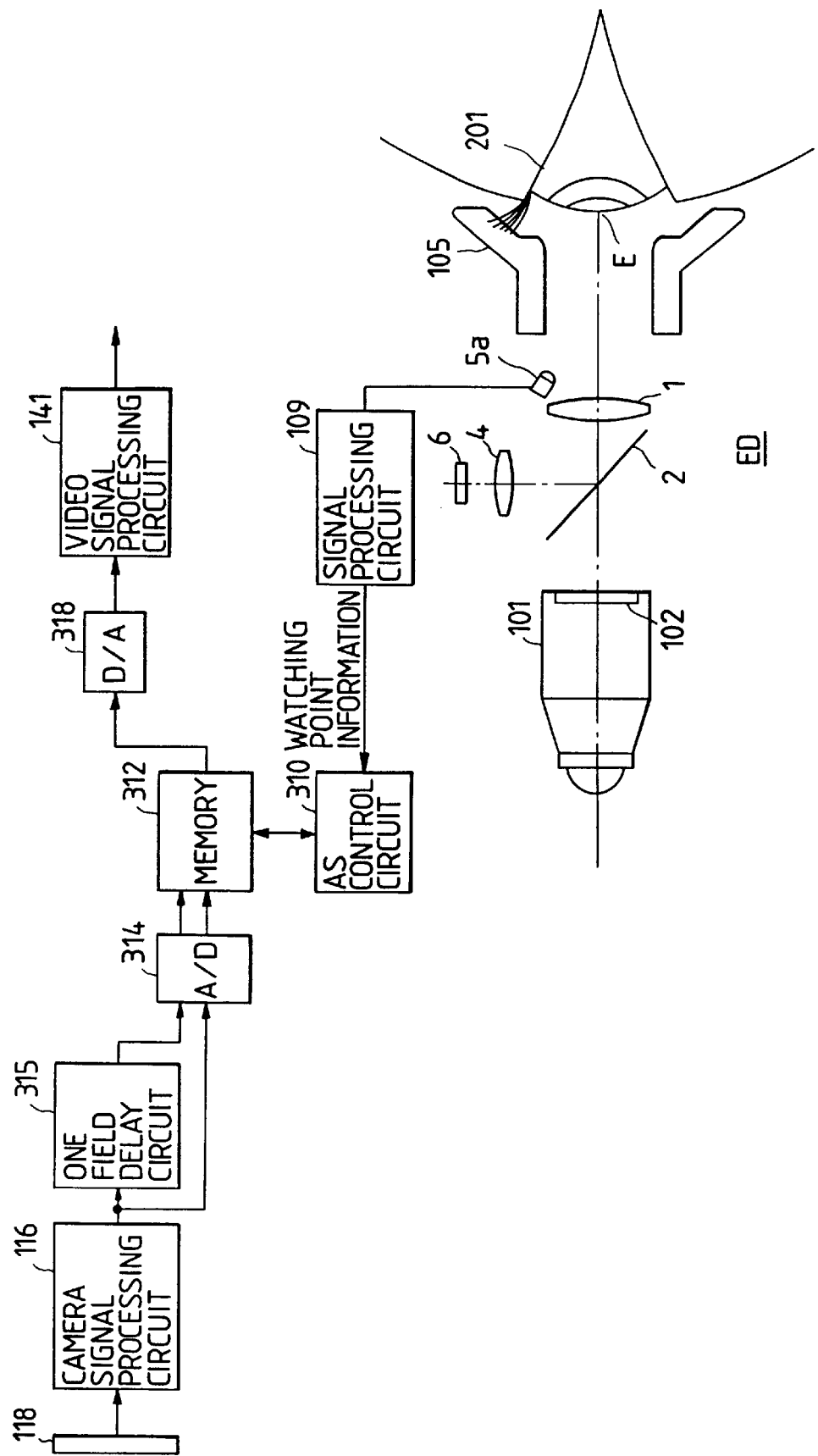
FIG. 10 is a block diagram of a second embodiment of the present invention.

In FIG. 10, components same as those in FIG. 1 are represented by same numbers and will not be explained further. There are provided a field delay circuit 315 for delaying, by a field period, the image signal released from the camera signal processing circuit 316; an A/D converter 314 for converting image signals released from the camera signal processing circuit and the field delay circuit 315 with a mutual delay of a field period, into digital signals; a memory 312 for storing the image signals released from the A/D converter 314; and an AS control circuit 310 for controlling the anti-vibration operation, by comparing the image signals of two frames, mutually displaced by a field period and stored in the memory 312, in the vibration detection area (AS area), thereby detecting the shaking or vibration of the camera as a movement vector, and compensating the vibration by shifting the readout range in reading the image signal of a field from said memory 312, based on said movement vector, in such a direction and a magnitude as to cancel said movement vector. Also the AS control circuit 310 receives the coordinates of the watching point, supplied from the signal processing circuit 109 of the sight line detection circuit ED, and sets the AS area, in case said coordinates are present in the finder image frame (in the present embodiment, the predetermined area of the finder shown in FIG. 9 is taken as the finder image frame, and the outside, of said predetermined area is taken as outside of the finder image frame), in a peripheral (background) area including said coordinates, outside the predetermined area, but, if said coordinates are outside the finder image frame, fixes the AS area in the peripheral area excluding the central part of the image frame.

A D/A converter 318 converts the image signal, read from the memory 312, into an analog signal for supply to a video signal processing circuit 141.

In the following there will be explained the setting of the AS area in the image frame by the AS control circuit, with reference to FIGS. 11 to 13.

Figure 11:
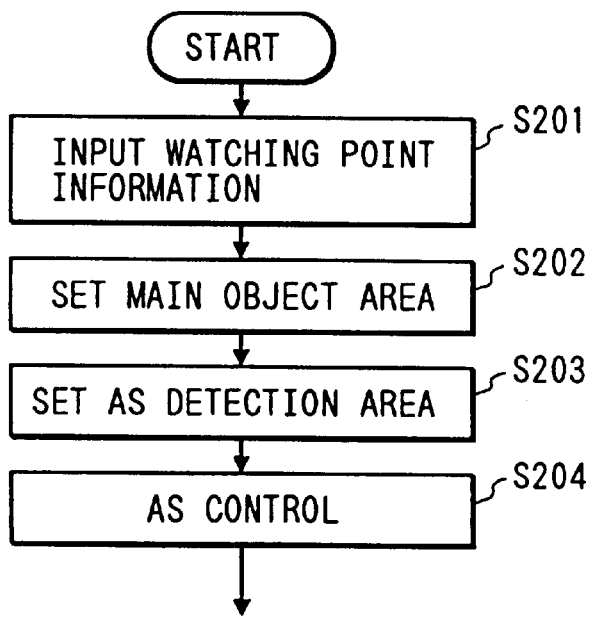
FIG. 11 is a flow chart for explaining the AS control in the second embodiment of the present invention.

FIG. 11 is a flow chart showing the sequence of AS area setting. A step S201 receives the coordinates (IPx, IPy) of the watching point, supplied from the signal processing circuit 109 of the sight line detection circuit ED and indicating the position watched by the operator in the finder image frame.

A step S202 judges the area where the main object is present, from the range of fluctuation of the coordinates of the watching point entered in the step S201. In the present embodiment, as shown in FIG. 12, the maximum and minimum values of the X- and Y-coordinates within a given time are stored, and the range of such coordinates is identified as the area of the main object. More specifically, an area OA of a width in the X-direction defined by the maximum value IPxmax and the minimum value IPxmin in the X-coordinates and a width in the Y-direction defined by the maximum value IPymax and the minimum value IPymin in the Y-coordinates, is judged as the area where the main object is present.

A step 203 selects and sets a vibration detecting (AS) area so as not to overlap with the main object area determined in the step S201. More specifically, as shown in FIG. 13, there are for example prepared in advance five areas (1)–(5) as the candidates for the AS area, and, if the main object area is judged as OA1 at the center of the image frame in the step S202, the areas (1), (2), (4) and (5), excluding the area (3) containing said main object area OA1, are considered as the background and selected as the AS area. Also if the main object area is judged as OA2, the areas (1), (2), (3) and (4), excluding the area (5) containing said OA2, are considered as the background and selected as the AS area.

Then a step S204 compares the image signals of a mutual interval of a field in the AS area set in the step S203, thereby determining the movement vector representing the magnitude and direction of the vibration, and effects the auto stabilizing operation, by controlling the readout position of the memory, so as to cancel said movement vector.

The distinction between the main object and the background, which is difficult to attain in the conventional AS control, is made possible by the detection of the watching point of the operator, or the line of sight thereof, so that the AS control can therefore be achieved with a high accuracy and without errors.

Figure 14:
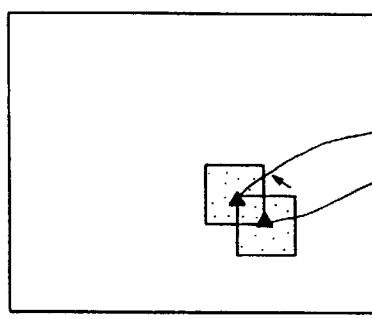
FIG. 14 is a view showing another example of the process for discriminating the area of the main object.

In the above-explained embodiment, the area of the main object is judged by memorizing the maximum and minimum values of the coordinates of the watching point in the X- and Y-directions within a certain time (cf. FIG. 12), but such method is not limitative. For example, it is also possible, as shown in FIG. 14, to select the center of the main object area at the moving averages of the coordinates of the watching point in the X- and Y-directions, and select a size, predetermined for example according to the focal length, for said area.

Figure 15:
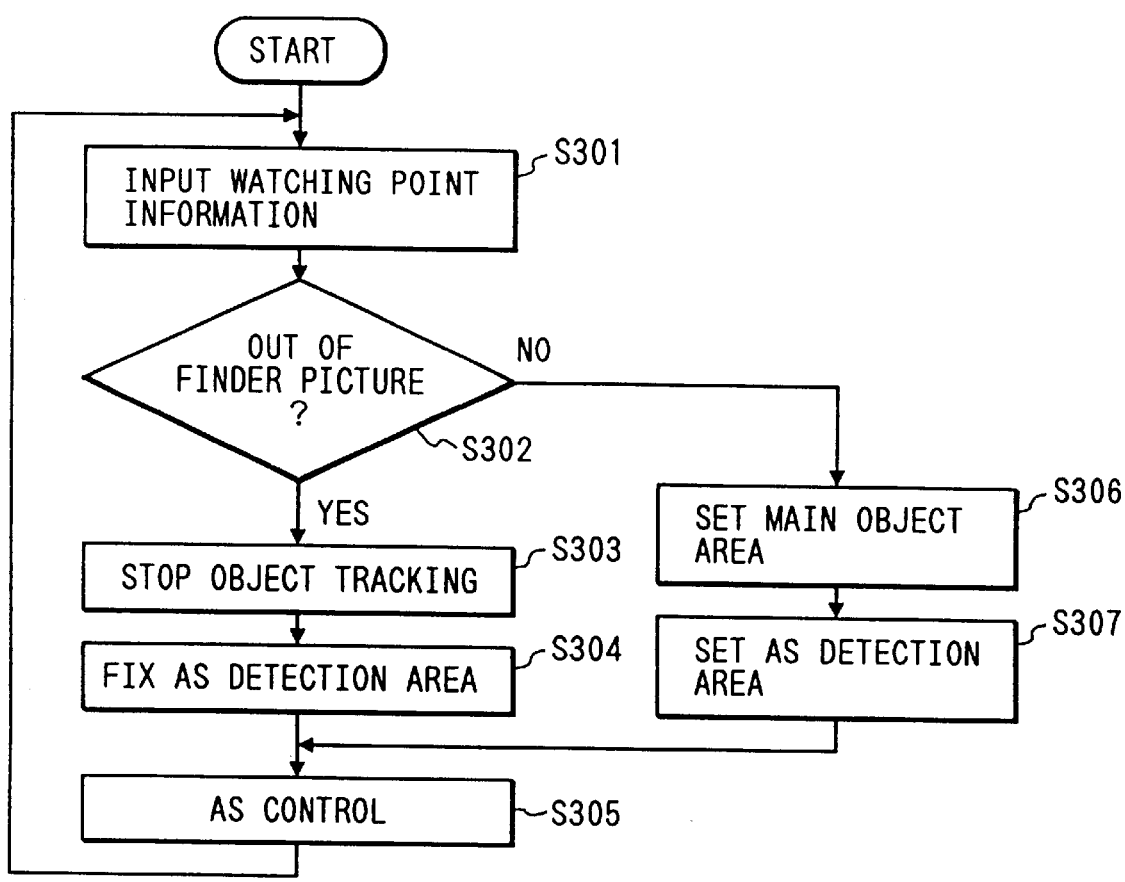
FIG. 15 is a flow chart showing the functions of the second embodiment shown in FIG. 11.

In the following there will be explained the process executed by the AS control circuit 310 of the apparatus shown in FIG. 10, with reference to a flow chart shown in FIG. 15.

A step S301 enters the coordinates (IPx, IPy) of the watching point of the operator, from the signal processing circuit 109 of the signal line detection circuit ED, and a step S302 discriminates whether said coordinates are present in the finder image frame. The discrimination inside and outside the image frame may be conducted on the entire finder image frame, or on a predetermined area as shown in FIG. 9 (utilizing the hatched and non-hatched areas).

If the step S302 identifies that the coordinates (IPx, IPy) are outside the finder image frame, a step S303 interrupts the object tracking operation by detecting the watching point and setting the AS detection area in a position other than the watching point. Then a step S304 sets the AS detection area in a peripheral area excluding the central part of the image frame, for example, in case of FIG. 13, in the areas (1), (2), (4) and (5) excluding the central area (3), and a step S305 compensates the vibration by shifting the image readout position from the memory in such a direction as to cancel the movement vector, detected from said AS detection areas (1), (2), (4), (5) and representing the vibration.

On the other hand, if the step S302 identifies that the coordinates of the watching point are within the finder image frame, the sequence proceeds to a step S306 for determining the coordinates of the watching point and setting the area of main object in the procedure explained in relation to FIGS. 11 to 14, then a step S307 selects an area excluding the main object area as the AS detection area, and the sequence proceeds to the step S305 for effecting the AS control operation.

In this manner there can be achieved exact distinction between the area of the main object watched by the operator and the background, whereby the auto stabilizing operation can always be conducted with reference to the background and can be stably maintained without errors even when the watching point of the operator is shifted out of the finder image frame.

The foregoing embodiments have been described with examples of auto focusing and auto stabilizing, but the present invention is likewise applicable, for example, to the setting of a light metering area for detecting the luminance signal for automatic exposure control (AE), or the setting of a color information detecting area for automatic white balancing (AWB).

The embodiment explained above detects the watching point, then discriminates whether the detected watching point is present without the image frame of the view finder, and, if the watching point is present inside the finder image frame, sets a control area for the required control at a certain area around the watching point, or, if not inside said image frame, fixes said control area at a predetermined area in the finder image frame. Thus there is obtained an advantage that the information for the required control can be obtained even when the watching point is positioned outside the finder image frame.

In the following there will be explained a third embodiment of the present invention. In the first embodiment explained above, when the watching point of the operator is positioned outside the finder image frame, or when the operator is estimated not watching the main object, the erroneous operation is avoided by fixing the distance measuring frame at a predetermined position at the center of the image frame. Also in the second embodiment, when the watching point of the operator is positioned outside the finder image frame, the main object is estimated to be at the center of the image frame and the surrounding area is selected as the AS detection area.

However, the object continues to move even while the operator does not watch the main object. Consequently, for example in a case of sudden movement of the object, it may not necessarily be at the center of the image frame, and the object is not necessarily securely caught in the auto focusing operation even if the distance measuring frame is fixed at the center of the image frame.

Therefore, in the third embodiment to be explained in the following, in a situation in which the operator is estimated to be watching the main object, there is conducted an object tracking operation by detecting the line of sight and setting the distance measuring frame at the watching point, but, in a situation in which the operator is estimated not to be watching the main object, there is conducted an automatic object tracking operation through the detection of variation in time of the features of the object, whereby the object can be tracked under any condition. The auto tracking method by detecting the movement of the object through detection of variation in time of the features of the object is disclosed, for example, in the U.S. Pat. Nos. 4,872,058 and 5,031,049.

The configuration of the entire camera of the present embodiment is similar to that shown in FIG. 1, except that the AF control circuit 110 is replaced by an AF control circuit 110' including the above-mentioned automatic object tracking circuit which is activated when the watching point of the operator is identified to be positioned outside the finder image frame.

Figure 16:
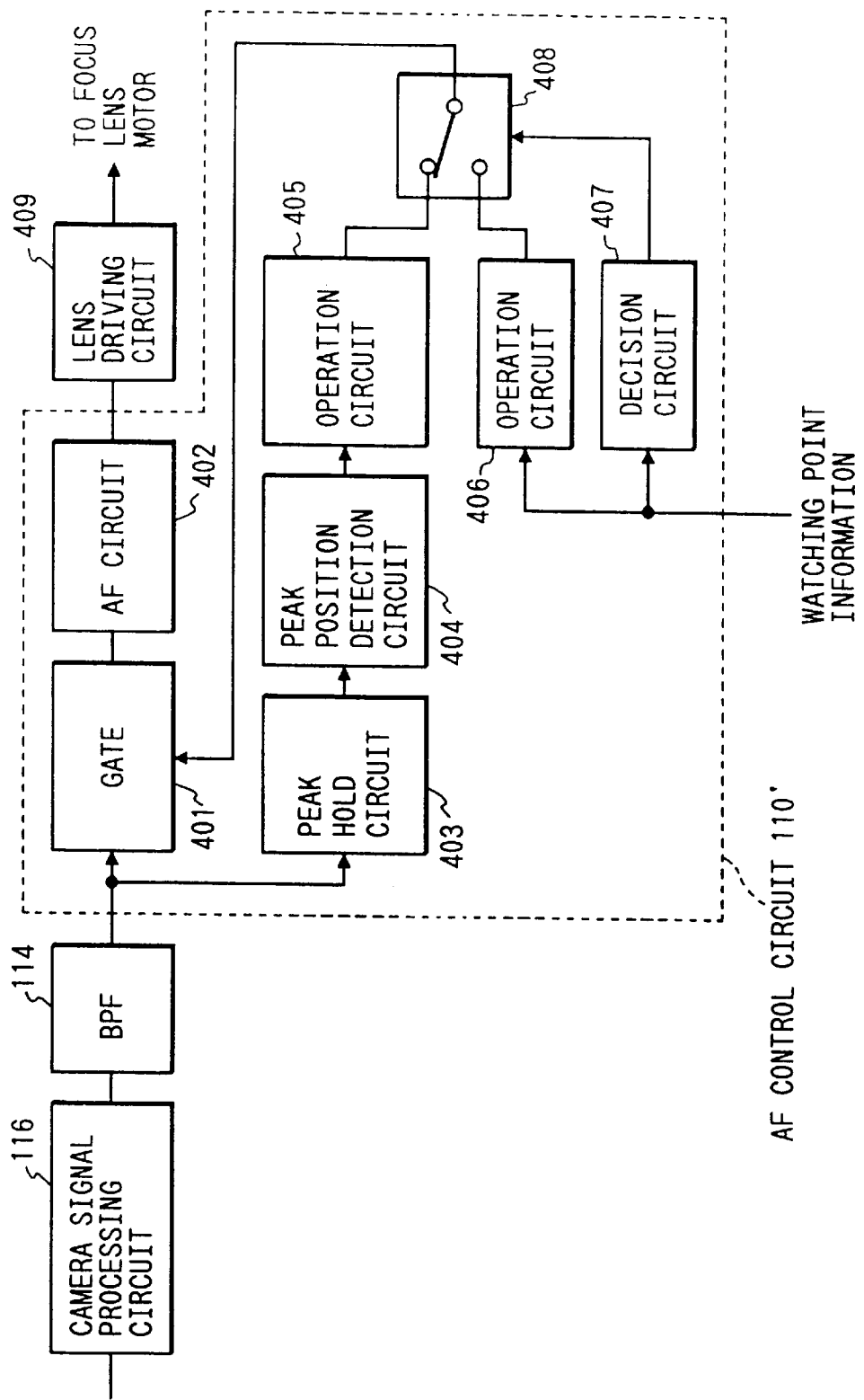
FIG. 16 is a block diagram showing an AF control circuit in the third embodiment of the present invention.

FIG. 16 is a block diagram of said AF control circuit 110'. A gate circuit 401 only passes, among the image signal released from the band pass filter 114, the signal corresponding to the distance measuring frame, and the size and position of the distance measuring frame can be arbitrarily varied by varying said passing range. An operation circuit 406 receives the information on the watching point, calculates the open/close timing of the gate circuit in case of setting the distance measuring frame at said watching point, and controls said gate circuit 401 through a switch 408, whereby the distance measuring frame can be positioned at the coordinates of the watching point.

The output of the band pass filter 114 is also supplied to a peak hold circuit 403, which detects the peak value of the high-frequency component within a field period of the image signal, and further to a peak position detection circuit 404 which detects the position of peak detection in the image frame. Said peak value corresponds to the highest level of the high-frequency component of the main object, with an extremely high contrast, and can be considered to represent the feature of the object. Also the position of said peak detection can be considered to indicate the position of the main object. An operation circuit 405 calculates the open/close timing of the gate circuit, based on the coordinates of the main object released from the peak position detection circuit 404, in case the distance measuring frame is to be set at said coordinates, and controls the gate circuit 401 through the switch 408, whereby the distance measuring frame can be positioned at the main object.

A discrimination circuit 407 receives the information on the watching point, discriminates whether the watching point is positioned inside a finder image frame as shown in FIG. 9, and shifts the switch 408 according to the result of said discrimination, whereby, in case the watching point is positioned inside the finder image frame, the operation circuit 406 is selected in order to effect the object tracking based on the watching point, while, in case the watching point is positioned outside the finder image frame, the operation circuit 405 is selected.

Figure 17:
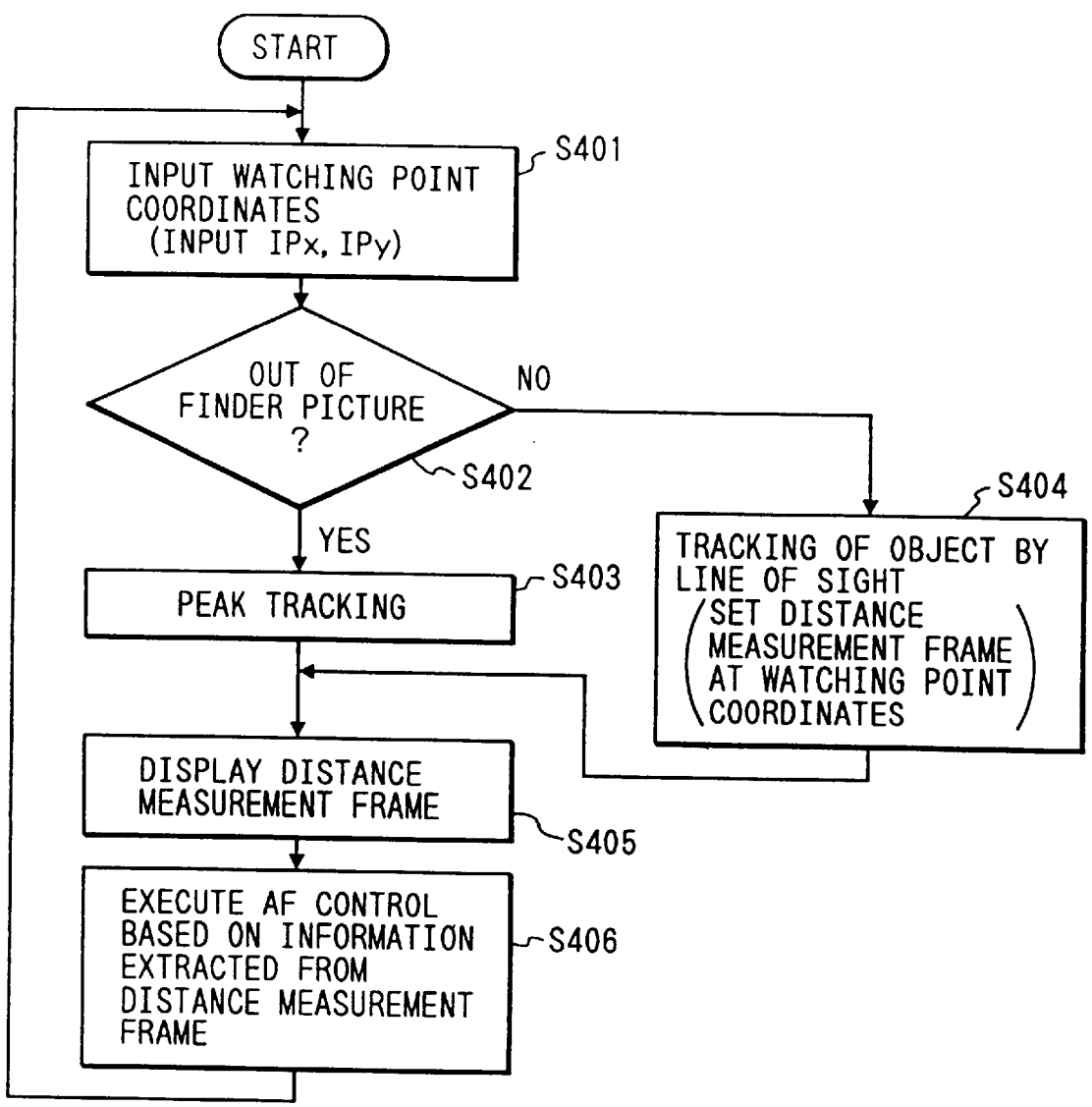
FIG. 17 is a flow chart showing the operations of the third embodiment of the present invention.

FIG. 17 is a flow chart showing the control sequence of the AF control circuit 110' shown in FIG. 16.

At first, the information on the watching point, indicating the position currently watched by the operator in the finder image frame, is received in the from of coordinates (IPx, IPy) in the finder, from the signal processing circuit 109 (step S401).

Then there is discriminated whether said received coordinates (IPx, IPy) are located inside or outside the finder image frame 102 (step S402). Said discrimination is executed in an area shown in FIG. 9. In the present embodiment, a hatched area is outside the finder image frame, but the detection of line of sight is conducted also in said hatched area for selecting the menu by the line of sight. Therefore, for discriminating whether the above-mentioned coordinates of the watching point are inside the image display frame of the view finder, the step S402 compares said coordinates with those defining said image display frame.

If the watching point of the operator is identified to be outside the image display frame of the view finder, for example in the hatched area for menu display, the object tracking is executed in the conventional manner not utilizing the information on the watching point but relaying solely on the information on the peak position of the aforementioned high-frequency component. In this state there is set the tracking range as well as the tracking coordinates (step S403).

On the other hand, if the watching point of the operator is identified to be inside the image frame of the view finder, the information on the watching point is added to the object tracking based on the peak position. For example, priority is given to the position of the watching point if the distance between the peak position and the position of the watching point exceeds a certain value. In this state the tracking range is set as well as the tracking coordinates (step S404).

A distance measuring frame display circuit 112 renews the display of the distance measuring frame, based on the tracking coordinates and the tracking range, obtained in the step S403 or S404 (step S405).

Then the AF control is executed by detecting the high-frequency component in thus renewed distance measuring area (step S406).

In the following there will be explained a fourth embodiment of the present invention, which detects the vibration by setting an AS detection area outside the distance measuring frame set in the above-explained third embodiment, thereby effecting the auto stabilizing control.

Figure 18:
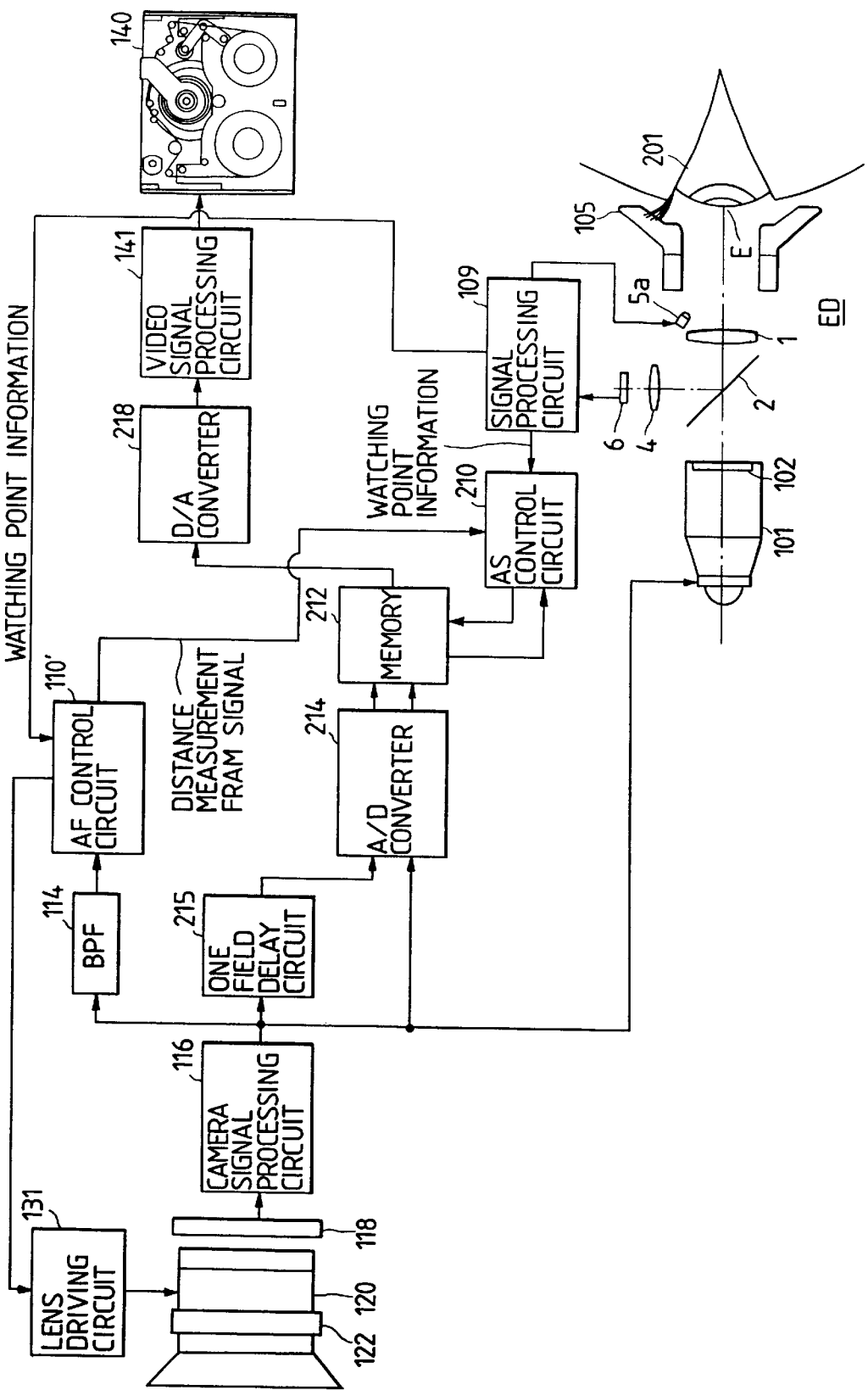
FIG. 18 is a block diagram showing a fourth embodiment of the present invention.

FIG. 18 is a block diagram showing the configuration of the present embodiment. Said configuration is practically identical with that shown in FIG. 10, except that the AF control circuit 110' shown in FIG. 16 is combined. Same components as those in the foregoing embodiments are represented by same numbers, and will not be explained further. The present embodiment is featured by a fact that the AF control circuit 110' supplies the information on the distance measuring frame to the AS control circuit 210, which sets the AS detection area for vibration detection in an outside area excluding the distance measuring frame.

Figure 19:
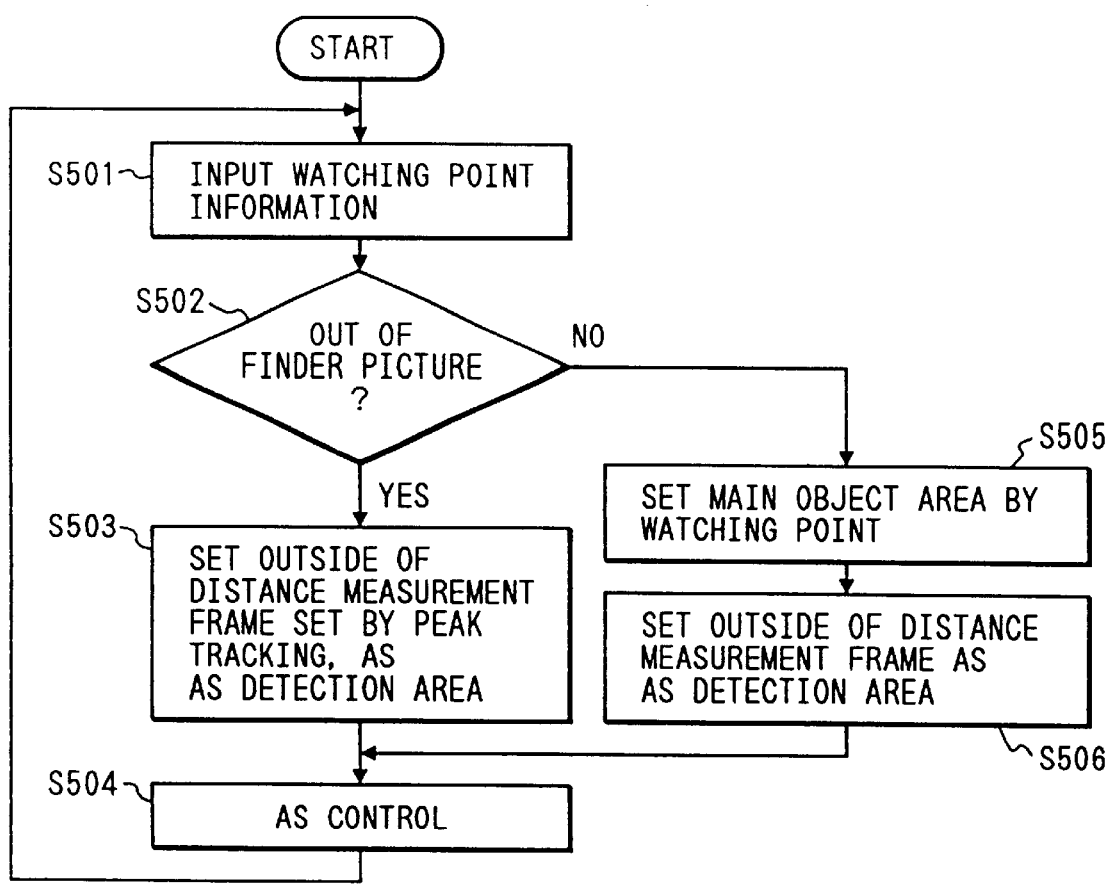
FIG. 19 is a flow chart showing the functions of the fourth embodiment of the present invention.

FIG. 19 is a flow chart showing the sequence of AS area setting by the AS control circuit. A step S501 receives, from the signal processing circuit 109 of the sight line detection circuit ED, the coordinates (IPx, IPy) of the watching point of the operator, and a step S502 discriminates whether said coordinates (IPx, IPy) are positioned inside or outside the finder image frame. Said discrimination may be made on the entire finder image frame, or on a predetermined areas as shown in FIG. 9 (hatched and non-hatched areas).

If the discrimination of the step S502 indicates that the coordinates (IPx, IPy) of the watching point are outside the finder image frame, the sequence proceeds to a step S503 for receiving the information of the distance measuring frame set by the peak detection in the AF control circuit 110' and setting the area of the image frame excluding the distance measuring frame as the AS detection area. Then a step S504 effects AS control by detection and compensation of the vibration. More specifically, the vibration is compensated by shifting the readout range of the image from the memory in such a direction as to cancel the movement vector detected from the AS detection area and representing the vibration.

On the other hand, if the step S502 identifies that the coordinates of the watching point are inside the finder image frame, a step S505 sets the area of the main object at the coordinate position of the watching point, then a step S506 sets the AS detection area in the area excluding said main object area, and the step S504 effects the AS control.

It is thus rendered possible to exactly distinguish the main object area watched by the operator from the background, and the AS control can be always executed with reference to the background and can be stably maintained without errors, even when the watching point of the operator is shifted out of the finder image frame.

Figure 12:
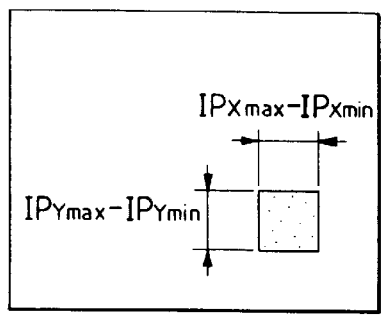
FIG. 12 is a view for explaining the process for discriminating the area of the main object.
Figure 13:
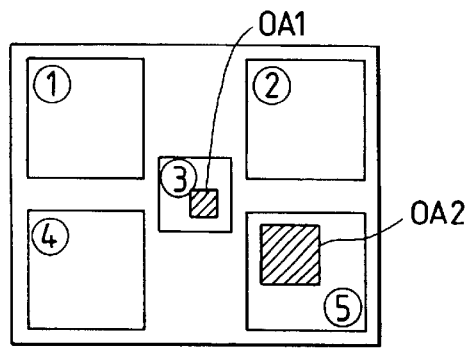
FIG. 13 is a view for explaining a setting operation for the AS detection area.

Also in this embodiment, the main object area is determined, as shown in FIG. 12, by memorizing the maximum and minimum values, in the X- and Y-directions, of the coordinates of the watching point within a given time. The present embodiment is same as the foregoing ones in that the vibration detection (AS) area is so selected as not to overlap with the main object area, and said vibration detection area may be selected from five areas (1) to (5) as shown in FIG. 13, or may be set in the entire area outside the distance measuring frame.

The foregoing embodiments have been described by auto focusing control and auto stabilizing control, but the present invention is likewise applicable, for example, to the setting of a light metering area for detecting the luminance signal for auto exposure control (AE) or the setting of a color information detecting area for automatic white balancing (AWB).

As explained in the foregoing, the embodiment of the present invention enables a phototaking operation providing an optimum image, without deteriorating the accuracy of the automatic vibration compensation utilizing the detection of line of sight, by means of discrimination of the coordinates of the watching point of the operator, even when said watching point is positioned outside the image frame of the electronic view finder.

Furthermore, the present invention is similarly applicable to the automatic exposure control (AE) or automatic white balancing (AWB). The foregoing embodiments are limited to the application to a camcorder, but the present invention is naturally applicable to the recording devices employing other recording media such as a floppy disk, an optical disk and a magneto optical disk. Also the present invention is applicable to the moving image and the still image.

As explained in the foregoing, the present invention interrupts the object tracking operation utilizing the watching point of the operator and initiates the conventional tracking method not utilizing the detection of line of sight, if the watching point of the operator detected by the sight line detecting device is positioned in an area which is outside of the finder image frame and which is not watched by the operator as long as he watches the main object. It is thus rendered possible to improve the accuracy of AE, AF, AWB or AS tracking operation utilizing the sight line detecting device, and to achieve optimized phototaking operation.

What is claimed is:

1. An electric device comprising:
monitor display having an image displaying area for displaying an image in a central part on a monitor screen and a menu displaying area for displaying a menu around the image displaying area on the monitor screen;
visual line detection means for detecting the visual line of the operator's eye on the monitor screen;
image processing means for setting an extracting area on the monitor screen for extracting a predetermined information of the image; and
controlling means for controlling said image processing means to shift the extracting area to a position of the visual line by said visual line detection means in the case that the visual line is detected on the image displaying area and for controlling said image processing means regardless of the visual line and selecting and performing one of a function in the menu displayed at a position of the visual line in the case that the visual line is detected on the menu displaying area detected by said visual line detection means.

2. A device according to claim 1, wherein said monitor display is an electric viewfinder of a video camera.

3. A device according to claim 1, wherein said processing means includes a focus control means.

4. A device according to claim 3, wherein the extracting area is a focus detecting area for extracting a high frequency component of an image signal.

5. A device according to claim 1, wherein said processing means including an image movement correcting means for detecting a movement of image and correcting the movement of image.

6. A device according to claim 5, wherein the extracting area is a focus detecting area for extracting a high frequency component of an image signal, and said processing means sets a movement detecting area for detecting the movement of said image around the focus detecting area.

7. An electric device comprising:
a display having an image displaying area for displaying an image in a central part of a display screen and a menu displaying area for displaying a menu around the image displaying area on the display screen;

visual line detection means for detecting the visual line of the operator's eye on the display screen;

image processing means for setting a work area on the display screen for executing a predetermined image processing with the displayed image; and controlling means for controlling said image processing means to change a position of the work area according to a position of the visual line by said visual line detection means in the case that the visual line is detected on the image displaying area and for controlling said image processing means regardless of a change of the position of the visual line and selecting and performing a function in the menu displayed corresponding to a position of the visual line in the case that the visual line is detected on the menu displaying area detected by said visual line detection means.

8. A device according to claim 7, wherein said monitor display is an electric viewfinder of a video camera.

9. A device according to claim 8, wherein said processing means including a focus control means and the work area is a focus detecting area for extracting a high frequency component of an image signal.

10. A device according to claim 7, wherein said processing means includes an image movement correcting means for detecting a movement of image and correcting the movement of image.

11. An electric device adapted to perform a given function in respective first and second different manners, comprising:

a monitor display screen having a first part for displaying an image and having a second part displaying a menu peripheral to said first part;

visual line detection means for detecting the visual line of the operator's eye in the monitor display screen;

image processing means for setting an extracting area on the monitor screen for extracting a predetermnined information of the image; and controlling means for controlling said image processing means to shift the extracting area to position of the visual line in the case that the visual line is detected in said monitor display screen first part and to perform said given function in said first manner and for controlling said image processing means to perform said given function in said second manner in the case that the visual line is detected in said monitor display screen second part.

12. A device according to claim 11, wherein said monitor display is an electric viewfinder of a video camera.

13. A device according to claim 11, wherein said processing means includes a focus control means.

14. A device according to claim 13, wherein the extracting area is a focus detecting area for extracting a high frequency component of an image signal.

15. A device according to claim 11, wherein said processing means including an image movement correcting means for detecting a movement of image and correcting the movement of image.

16. A device according to claim 15, wherein the extracting area is a focus detecting area for extracting a high frequency component of an image signal, and said processing means sets a movement detecting area for detecting the movement of said image around the focus detecting area.

17. An electric device adapted to perform first or second different functions, comprising:

a monitor display screen having a first part for displaying an image and having a second part displaying a menu therein peripheral to said first part;

visual line detection means for detecting the visual line of the operator's eye on the monitor display screen;

image processing means for setting a work area on the monitor display screen for executing a predetermined image processing with the displayed image; and controlling means for controlling said image processing means to change a position of the work area according to a position of the visual line in the case that the visual line is detected in said first part of said monitor display screen by said visual line detection means and to perform said first function and for controlling said image processing means regardless of a change of the position of the work area in response to a change of the visual line and performing said second function in the case that the visual line is detected in said second part of said monitor display screen by said visual line detection means.

18. A device according to claim 17, wherein said monitor display is an electric viewfinder of a video camera.

19. A device according to claim 18, wherein said processing means including a focus control means and the work area is a focus detecting area for extracting a high frequency component of an image signal.

20. A device according to claim 17, wherein said processing means includes an image movement correcting means for detecting a movement of image and correcting the movement of image.

* * * * *

UNITED STATES PATENT AND TRADEMARK OFFICE
CERTIFICATE OF CORRECTION

PATENT NO. : 6,246,437 B1
DATED : June 12, 2001
INVENTOR(S) : Kitahiro Kaneda

It is certified that error appears in the above-identified patent and that said Letters Patent is hereby corrected as shown below:

Column 1,
Line 20, delete "art" and insert -- are --.
Line 6, delete "5,541655" and insert -- 5,541,655 --.

Column 6,
Line 44, delete "|Z2b' - Z2a|" and insert -- |Z2b' - Z2a'| --.

Column 9,
Line 23, delete "outside, of" and insert -- outside of --.

Signed and Sealed this

Seventh Day of May, 2002

Attest:

Attesting Officer

JAMES E. ROGAN
*Director of the United States Patent and Trademark Office*